(12) United States Patent
Morimoto

(10) Patent No.: US 8,335,378 B2
(45) Date of Patent: Dec. 18, 2012

(54) IMAGE PROCESSING APPARATUS AND IMAGE PROCESSING METHOD

(75) Inventor: Masami Morimoto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 737 days.

(21) Appl. No.: 12/507,128

(22) Filed: Jul. 22, 2009

(65) Prior Publication Data

US 2010/0021057 A1      Jan. 28, 2010

(30) Foreign Application Priority Data

Jul. 24, 2008   (JP) .................................. 2008-191018

(51) Int. Cl.
*G06K 9/00* (2006.01)
(52) U.S. Cl. .................................................... 382/168
(58) Field of Classification Search .......... 382/162–168, 382/170, 173, 176, 181, 254; 358/518–522; 348/396.1, 672
See application file for complete search history.

(56) References Cited

U.S. PATENT DOCUMENTS 5,867,593 A * 2/1999 Fukuda et al. ................ 382/176
8,018,494 B2 * 9/2011 Yokomitsu et al. ...... 348/208.14

FOREIGN PATENT DOCUMENTS

| JP | 2000-350031 A | 12/2000 |
|---|---|---|
| JP | 2006-41744 A | 2/2006 |
| JP | 2006-217424 A | 8/2006 |

OTHER PUBLICATIONS

Japanese Office Action dated Sep. 20, 2011 (and English translation thereof) in counterpart Japanese Application No. 2008-191018.

* cited by examiner

*Primary Examiner* — Jose Couso
(74) *Attorney, Agent, or Firm* — Holtz, Holtz, Goodman & Chick, PC

(57) ABSTRACT

A Y histogram creation processing unit detects the signal level (luminance level) of the Y signal component of each pixel of a frame on the basis of YUV signals, and creates a histogram by totaling the number of pixels for each signal level. In this processing, a histogram is created by adding values weighted depending on whether a region in a predetermined range around each pixel includes a monotonous pattern. A histogram shape processing unit shapes the histogram. An input/output correction characteristic creation processing unit performs normalization by cumulative addition. A correction lookup table creation processing unit creates a lookup table on the basis of the input/output correction characteristic obtained by the input/output correction characteristic creation processing unit. A Y correction processing unit corrects a Y signal on the basis of the table.

6 Claims, 4 Drawing Sheets

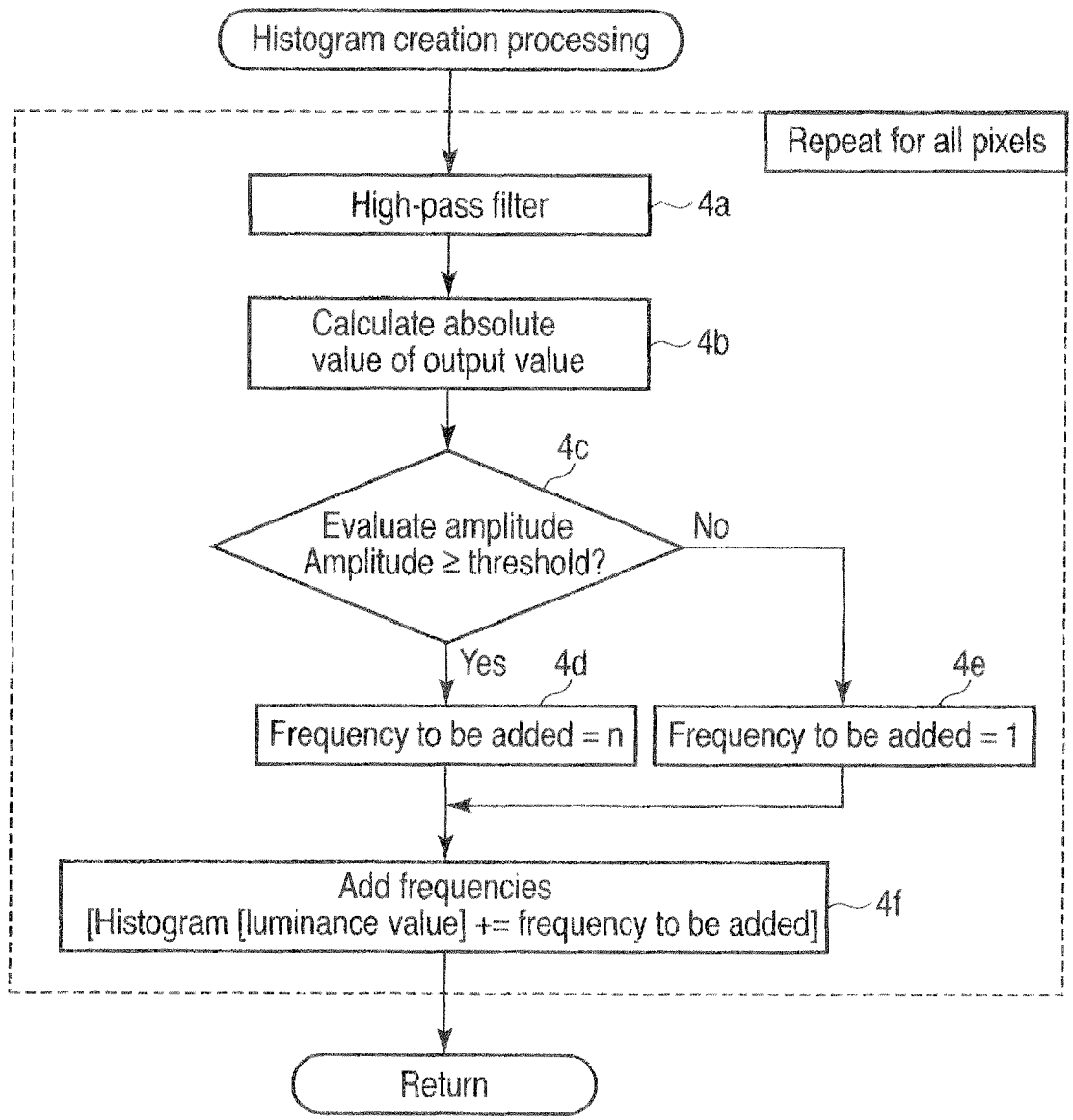
F I G. 4

IMAGE PROCESSING APPARATUS AND IMAGE PROCESSING METHOD

CROSS-REFERENCE TO RELATED APPLICATIONS

This application is based upon and claims the benefit of priority from prior Japanese Patent Application No. 2008-191018, filed Jul. 24, 2008, the entire contents of which are incorporated herein by reference.

BACKGROUND OF THE INVENTION

1. Field of the Invention

The present invention relates to an image processing apparatus for correcting an image.

2. Description of the Related Art

As is commonly known, some conventional image processing apparatuses employ a method of correcting the tone of a display image by luminance value conversion using histogram equalization. In such an apparatus, the correction amount becomes greater as the frequency of the histogram of the luminance value in an input image increases. In a region having high-frequency components, i.e., a region including a complex pattern(texture), a given correction amount is applicable to enhance the pattern and perform desirable correction. However, in a region including a monotonous pattern, applying the same correction amount makes a tonal jump recognizable.

To prevent this, methods have conventionally been proposed which equalized a histogram by limiting the correction amount in a tonal range where frequencies concentrate. For example, a method disclosed in Jpn. Pat. Appln. KOKAI Publication No. 2006-217424 detects one or more luminance ranges where frequencies concentrate and limits the dynamic range after correction in each range, thereby preventing overcorrection in a shifted histogram of luminance signals Y.

However, the above-described conventional image processing apparatus cannot determine whether a region should be enhanced or not because region determination is based only on the distribution of a histogram. Consequently, it can only perform adjustment to reduce the correction amount.

BRIEF SUMMARY OF THE INVENTION

The present invention has been made to solve the above problem, and has as its object to provide an image processing apparatus and an image processing method which can correct an image using a correction amount corresponding to the complexity of the image pattern (texture).

In order to achieve the above object, the present invention provided an image processing apparatus comprising: a first detection unit which detects, from an image signal, a luminance value of each pixel included in one frame; a second detection unit which detects, from the image signal for each pixel, complexity of a pattern in a region including the pixel; a weighting unit which sets, for each pixel, a frequency corresponding to the complexity detected by the second detection unit; a histogram creation unit which creates a histogram by totaling, for each luminance value, the frequencies of each pixel set by the weighting unit based on the basis of the luminance value of each pixel detected by the first detection unit; a correction characteristic creation unit which creates a correction characteristic by cumulative addition in a direction of the luminance value based on the basis of the histogram created by the histogram creation unit; and a correction unit which corrects a luminance of the image signal based on the basis of the correction characteristic created by the correction characteristic creation unit.

As described above, in the present invention, when correcting a luminance signal on the basis of the histogram of pixel luminances, a histogram is created by totaling frequencies which are weighted in accordance with the complexity of the pattern (texture) around each pixel.

Hence, according to the present invention, the luminance level can be corrected on the basis of a luminance histogram considering the complexity of an image. It is therefore possible to provide an image processing apparatus and an image processing method which can correct an image using a correction amount corresponding to the complexity of the image pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a flowchart for explaining histogram creation processing shown in FIG. 3;

DETAILED DESCRIPTION OF THE INVENTION

An embodiment of the present invention will now be described with reference to the accompanying drawing.

Figure 1:
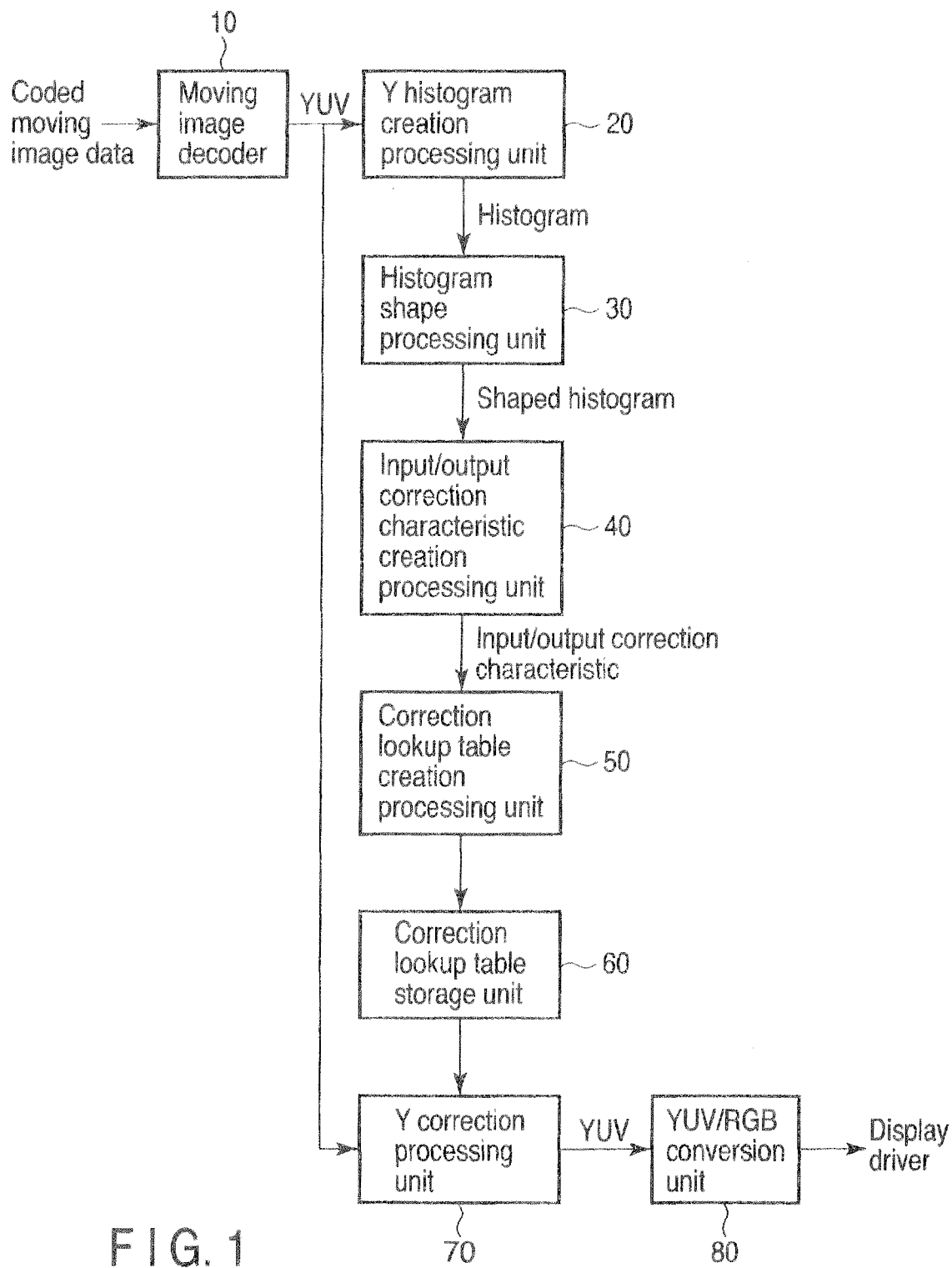
FIG. 1 is a block diagram showing the arrangement of an image processing apparatus according to an embodiment of the present invention.

FIG. 1 shows the arrangement of an image processing apparatus according to an embodiment of the present invention. The image processing apparatus is mounted in, e.g., a TV apparatus for receiving digital terrestrial broadcasting, a recording/playback apparatus for recording or playing back a broadcast, an apparatus for playing back moving image data recorded on an optical medium, or an apparatus for playing back moving image data distributed via a network.

The image processing apparatus includes a moving image decoder 10, Y histogram creation processing unit 10, histogram shape processing unit 30, input/output correction characteristic creation processing unit 40, correction lookup table creation processing unit 50, correction lookup table storage unit 60, Y correction processing unit 70, and YUV/RGB conversion unit 80.

These components can be implemented by one processor. The processor can operate in accordance with a control program and control data recorded in a storage unit, thereby implementing the functions of these units. When the units are implemented by the processor, the correction lookup table storage unit 60 may be provided independently.

The moving image decoder 10 decodes coded moving image data corresponding to one frame transmitted via broadcasting or a network or read out from a hard disk drive (HDD) or by a storage device using a recording medium such as a Digital Versatile Disc (DVD) or a flash drive, thereby converting the moving image data into a moving image in a YUV signal format. For example, an MPEG-2 decoder for a DVD or digital terrestrial broadcasting, or an H.264 decoder for one-segment broadcasting corresponds to the moving image decoder 10.

The Y histogram creation processing unit 20 detects the signal level (luminance level) of the Y signal component of each pixel of a frame on the basis of YUV signals output from the moving image decoder 10, and totals the number of pixels for each signal level, thereby creating a histogram. This processing is executed in each frame.

Figure 2:
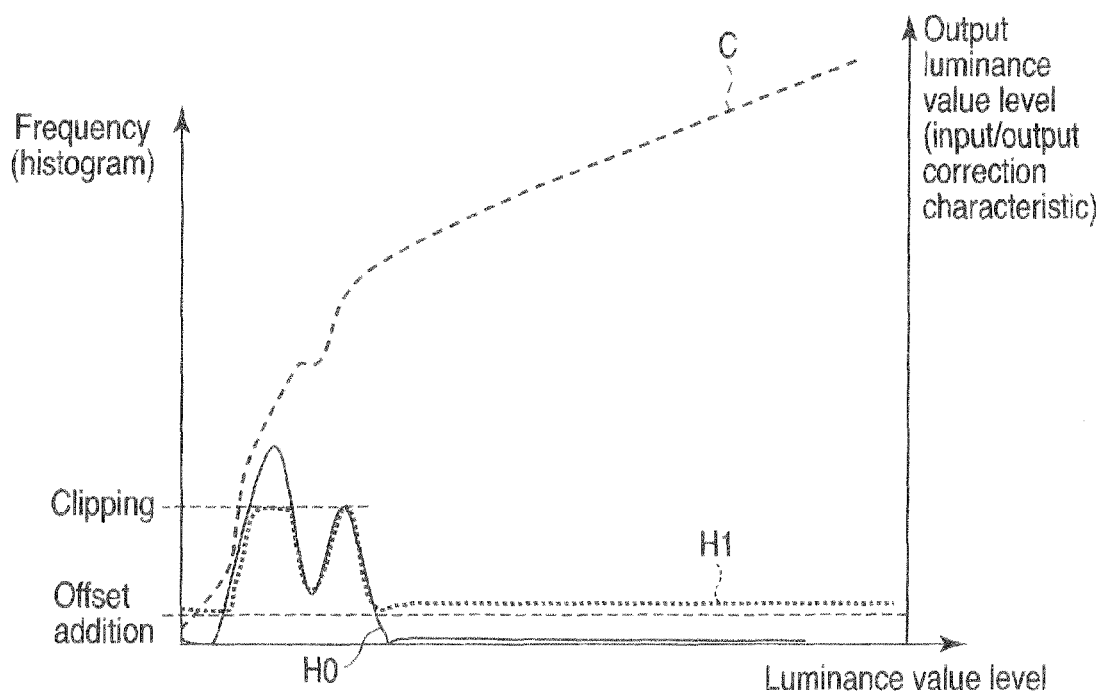
FIG. 2 is a graph for explaining a histogram and input/output correction characteristic generated by the image processing apparatus shown in FIG. 1.

With this processing, the frequency distribution of pixels corresponding to the signal levels is created, as shown in, e.g., FIG. 2. In a general histogram, the same value of, e.g., 1 is added for each pixel as a frequency. However, the Y histogram creation processing unit 20 adds a value weighted depending on whether a region in a predetermined range around each pixel includes a monotonous pattern(texture), as will be described later in detail If the region includes a monotonous pattern, 1 is added. Otherwise, 2 is added.

The histogram shape processing unit 30 shapes the histogram obtained by the Y histogram creation processing unit 20, thereby obtaining a histogram (to be referred to as a shaped histogram hereinafter) that has undergone shape processing. In this shape processing, the histogram is shaped not to generate an extreme difference between tonal ranges in an input/output correction characteristic created by the input/output correction characteristic creation processing unit 40 at the succeeding stage. In the example of FIG. 2, shape processing including clipping of lowering the peak and offset addition of raising the level of the whole tonal range is performed for the frequencies of a histogram 110 obtained by the Y histogram creation processing unit 20, thereby obtaining a shaped histogram H1.

When the frequencies concentrate in a specific tonal range beyond a preset first threshold, clipping is performed to prevent the tonal steps in the tonal range from extremely increasing. In offset addition, the whole tonal range is offset to prevent grayscale performance from degrading in succeeding processes because of the decrease in the number of tonal steps. Note that the offset addition adds, e.g., a value half the average frequency of the histogram, thereby reducing the frequency difference between tonal ranges.

The input/output correction characteristic creation processing unit 40 obtains, for each signal level, a cumulative frequency by cumulatively adding the frequencies in ascending order of signal level (luminance level) in the shaped histogram. The input/output correction characteristic creation processing unit 40 then obtains a characteristic (to be referred to as an input/output correction characteristic hereinafter) by normalizing the cumulative frequency at each signal level such that the cumulative frequency at the maximum signal level obtained by cumulatively adding all frequencies becomes 1.

The correction lookup table creation processing unit 50 creates a lookup table by multiplying the input/output correction characteristic by the maximum signal level, and records it in the correction lookup table storage unit 60 as a correction lookup table. For example, if the maximum signal level of a Y signal is 235, and the input/output correction characteristic at a certain signal level is 0.5, the correction lookup table serves as a correction table to correct the signal level to 235×0.5. FIG. 2 shows an input/output correction characteristic C as an example.

The Y correction processing unit 70 corrects the Y signal of YUV signals of one frame output from the moving image decoder 10 in accordance with the correction lookup table stored in the correction lookup table storage unit 60. The corrected Y signal is output to the YUV/RGB conversion unit 80 as YUV signals together with the remaining uncorrected YUV signal components (color difference signals).

The YUV/RGB conversion unit 80 converts the YUV signals output from the Y correction processing unit 70 into RGB signals and outputs them to a display driver (not shown). The YUV/RGB conversion unit 80 converts, e.g., content of digital broadcasting using a conversion formula of the ITU-R BT.709 standard.

Figure 3:
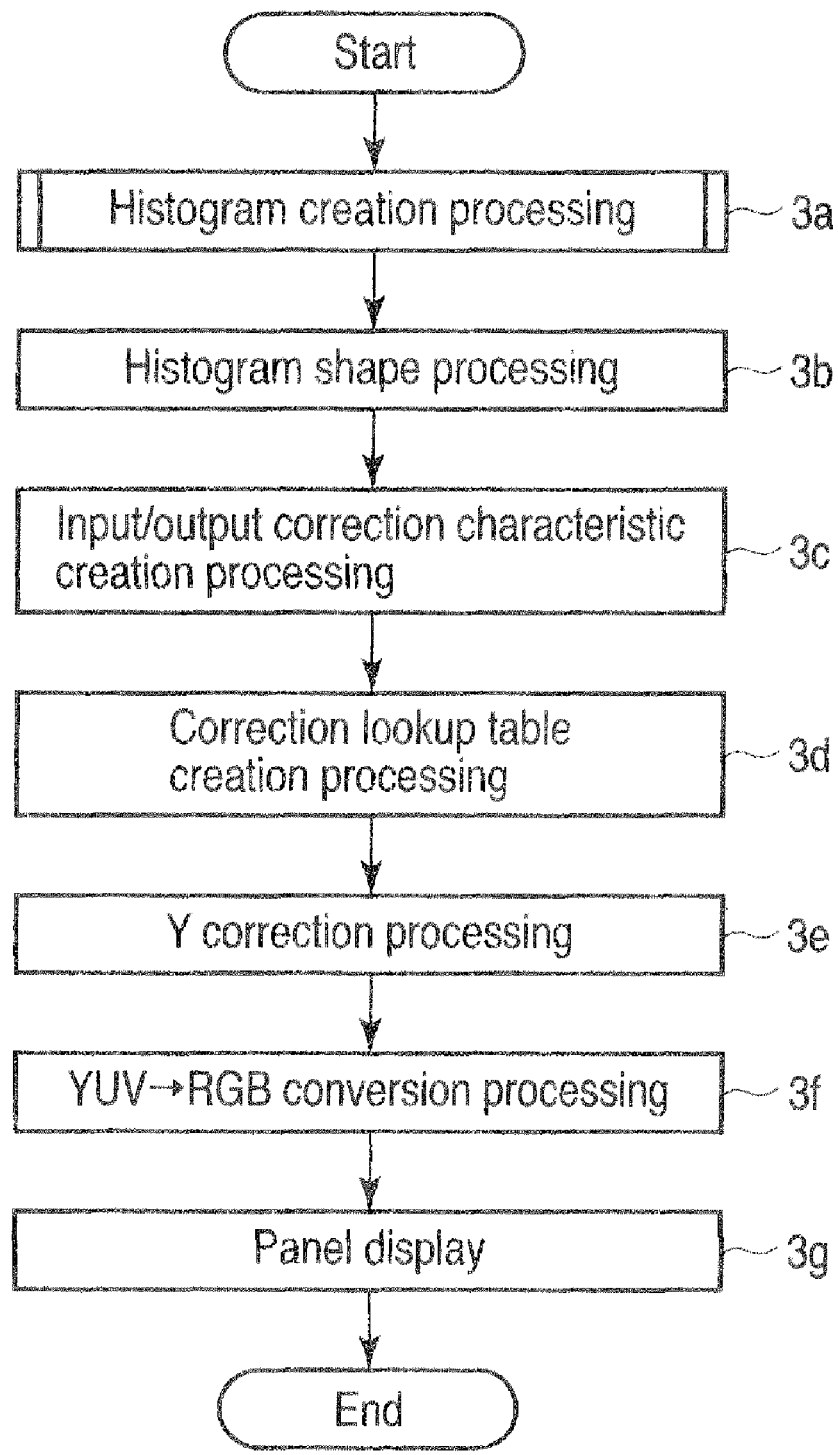
FIG. 3 is a flowchart for explaining the operation of the image processing apparatus shown in FIG. 1.

The operation of the image processing apparatus having the above-described arrangement will be described next. FIG. 3 is a flowchart for explaining the operation of the image processing apparatus having the above-described arrangement. The processing shown in FIG. 3 is repeatedly executed for each frame. This will be explained below with reference to FIG. 3.

In step 3a, on the basis of the YUV signals of one frame output from the moving image decoder 10, the Y histogram creation processing unit 20 detects the signal level (luminance level) of the Y signal component of each pixel included in the frame. Then, the Y histogram creation processing unit 20 creates a histogram by summing the number of pixels for each signal level, and weights a frequency of each signal level of the histogram in accordance with complexity of the image in a region in a predetermined range around each pixel.

More specifically, a histogram is created by executing processing shown in FIG. 4 for each pixel. The histogram creation processing by the Y histogram creation processing unit 20 will be described below with reference to FIG. 4.

Figure 5:
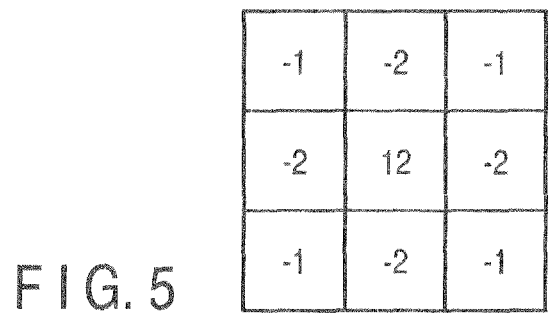
FIG. 5 is a view snowing an example of the coefficients of a high-pass filter shown in FIG. 4.

In step 4a, referring to the luminances of pixels in a region within a predetermined range around a process target pixel on the basis of Y signal components using a high-pass filter, the Y histogram creation processing unit 20 extracts the high-frequency component of the Y signal in the region. The process then advances to step 4b. FIG. 5 shows an example of a high-pass filter in a 3×3 pixel region.

In step 4b, the Y histogram creation processing unit 20 obtains the absolute value of the high-frequency component extracted in step 4a, thereby obtaining the magnitude of the amplitude. Then, the process advances to step 4c.

In step 4c, the Y histogram creation processing unit 20 determines whether the magnitude of the amplitude obtained in step 4b is greater than or equal to a preset threshold if the magnitude of the amplitude is greater than or equal to the preset threshold, i.e., if the pattern in the process target region is complex, the process advances to step 4d. If the magnitude of the amplitude is less than the preset threshold, i.e., if the pattern in the process target region is monotonous, the process advances to step 4e.

In step 4d, the Y histogram creation processing unit 20 sets the frequency to be added to n (n>1) because the pattern in the process target region is complex. The process then advances to step 4f.

In contrast, in step 4e, the Y histogram creation processing unit 20 sets the frequency to be added to the normal value 1 because the pattern in the process target region is monotonous. The process then advances to step 4f.

Figure 6:
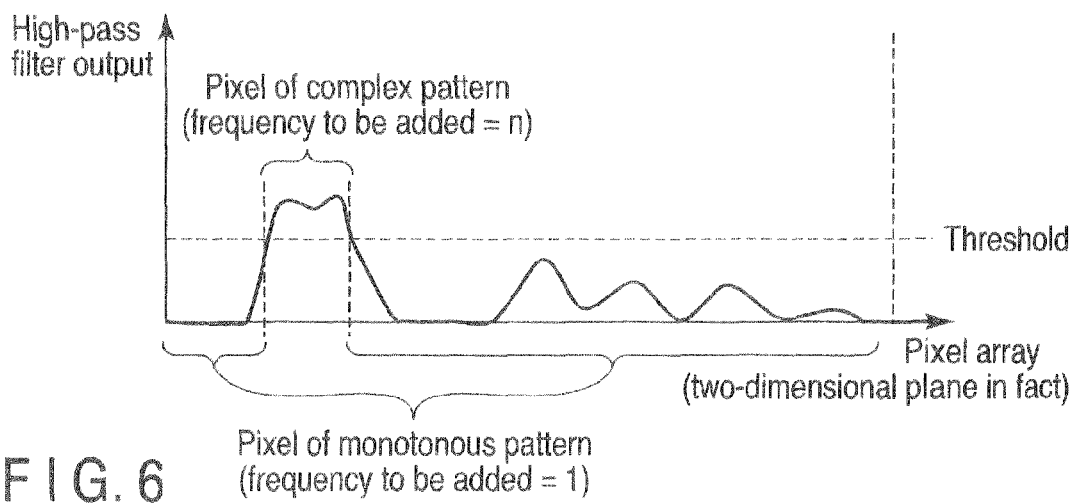
FIG. 6 is a graph showing an example of the input/output result of the high-pass filter shown in FIG. 4.

That is, the frequency to be added is set to n for a pixel belonging to a region including a complex pattern, or 1 for a pixel belonging to a region including a monotonous pattern, as shown in, e.g., FIG. 6.

In step 4f, the Y histogram creation processing unit 20 adds the frequency to be added decided in step 4d or 4e as the frequency of the histogram corresponding to the signal level of the process target pixel, and ends the processing of the process target pixel.

This processing is executed for all pixels of one frame. In the processing shown in FIG. 4, the frequency to be added is set in two steps, 1 and n. However, it may be set in three or more steps in accordance with the complexity of the pattern in the process target region.

The threshold to be used in step 4c may be decided on the basis of a quantization coefficient. If the output of the high-pass filter in step 4a is less than or equal to the threshold, the signal may be regarded as noise on a monotonous pattern, and the frequency for a pixel in a monotonous region may be added.

In the above description, a high-pass filter is used in step 4a. Instead, the variance of the signal Levels of neighboring pixels around each pixel may be obtained in step 4a, and this variance may be compared with a threshold in step 4c. If the variance is large, the frequency to be added is set large. This procedure is expected to exhibit the same effect as a high-pass filter.

The description will be continued referring back to FIG. 3.

In step 3b, the histogram shape processing unit 30 shapes the histogram obtained by the Y histogram creation processing unit 20 in step 3a by clipping of lowering the peak and offset addition of raising the level not to generate an extreme difference between tonal ranges, thereby obtaining a shaped histogram.

In step 3c, the input/output correction characteristic creation processing unit 40 obtains, for each signal level, a cumulative frequency by cumulatively adding the frequencies on the basis of the shaped histogram shaped by the histogram shape processing unit 30 in step 3b. Then, the input/output correction characteristic creation processing unit 40 normalizes the cumulative frequency at each signal level such that the cumulative frequency obtained by cumulatively adding all frequencies becomes 1, thereby obtaining an input/output correction characteristic.

In step 3d, the correction lookup table creation processing unit 50 creates a correction lookup table by multiplying the input/output correction characteristic obtained by the input/output correction characteristic creation processing unit 40 in step 3c by the maximum signal level, and records it in the correction lookup table storage unit 60. The correction lookup table associates the luminance value of an input signal with a correction value (the luminance value of an output signal).

In step 3e, the Y correction processing unit 70 converts the Y signal of YUV signals of one frame output from the moving image decoder 10 into a correction value in accordance with the correction lookup table recorded in the correction lookup table storage unit 60 in step 3d, and outputs it as YUV signals together with the remaining uncorrected YUV signal components.

In step 3f, the YUV/RGB conversion unit 80 converts the YUV signals output from the Y correction processing unit 70 into PGB signals.

In step 3g, the display driver drives and controls the display on the basis of the RGB signals obtained by the YUV/DOB conversion unit 80 in step 3f, thereby displaying a video of one frame.

As described above, when correcting a luminance signal on the basis of the histogram of the luminance of each pixel, the image processing apparatus having the above-described arrangement creates a histogram by totaling frequencies which are weighted in accordance with the complexity of the pattern around each pixel.

According to the image processing apparatus having the above-described arrangement, it is possible to correct an image using a correction amount corresponding to the complexity of the image pattern. In a region including a complex pattern, the pattern is enhanced, resulting in desirable correction. In a region including a monotonous pattern, correction can be done while suppressing a tonal jump.

Note that the present invention is not exactly limited to the above embodiments, and the constituent elements can be modified in the stage of practice without departing from the spirit and scope of the invention. Various inventions can be formed by properly combining a plurality of constituent elements disclosed in the above embodiments. For example, several constituent elements may be omitted from all the constituent elements described in the embodiments. In addition, constituent elements throughout different embodiments may be properly combined.

Additional advantages and modifications will readily occur to those skilled in the art therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a first detection module configured to detect, from an image signal, a luminance value of each pixel included in one frame;
a second detection module configured to detect, from the image signal for each pixel, complexity of a pattern in a region including the pixel by detecting, from the image signal, an amplitude of a high frequency component in a predetermined region around the pixel;
a weighting module configured to set, for each pixel, a frequency corresponding to the complexity detected by the second detection module;
a histogram creation module configured to create a histogram by totaling, for each luminance value, the frequencies of the pixels set by the weighting module, on the basis of the luminance value of each pixel detected by the first detection module;
a correction characteristic creation module configured to create a correction characteristic by cumulative addition in a direction of the luminance value on the basis of the histogram created by the histogram creation module; and
a correction module configured to correct a luminance of the image signal on the basis of the correction characteristic created by the correction characteristic creation module.

2. The apparatus according to claim 1, wherein the weighting module sets, for each pixel, a frequency corresponding to the amplitude of the high-frequency component detected by the second detection module.

3. The apparatus according to claim 1, wherein the correction module comprises:
a table creation module configured to create a table to associate a luminance value with a correction value on the basis of the correction characteristic created by the correction characteristic creation module; and a conversion module configured to convert the luminance of the image signal into a correction value by looking up the table created by the table creation module.

4. An image processing method for an image processing apparatus including a processor, the method comprising:

detecting with the processor, from an image signal, a luminance value of each pixel included in one frame;

detecting with the processor, from the image signal for each pixel, complexity of a pattern in a region including the pixel by detecting, from the image signal, an amplitude of a high frequency component in a predetermined region around the pixel;

setting with the processor, for each pixel, a frequency corresponding to the detected complexity;

creating a histogram with the processor by totaling, for each luminance value, the set frequencies of the pixels on the basis of the detected luminance value of each pixel;

creating a correction characteristic with the processor by cumulative addition in a direction of the luminance value on the basis of the histogram; and correcting, with the processor, a luminance of the image signal on the basis of the correction characteristic.

5. The method according to claim 4, wherein in setting the frequency, a frequency corresponding to the detected amplitude of the high-frequency component is set for each pixel.

6. The method according to claim 4, wherein correcting the luminance comprises:

creating a table to associate a luminance value with a correction value on the basis of the correction characteristic; and converting the luminance of the image signal into a correction value by looking up the table.

* * * * *